US008490097B2

United States Patent
Sano et al.

(10) Patent No.: US 8,490,097 B2
(45) Date of Patent: Jul. 16, 2013

(54) INFORMATION PROCESSING APPARATUS HAVING A PLURALITY OF CONTROL UNITS RECEIVING TRANSACTIONS AT THE CURRENT TIME SUCH THAT WHEN THE CURRENT TIME COINCIDES WITH MOST RECENT START-UP TIME THE CONTROL UNITS UPDATE THE START-UP TIME WITH THE CURRENT TIME AND SUM UP THE NUMBER OF TRANSACTIONS BEING PROCESSED LIMITED TO A PREDETERMINED THRESHOLD

(75) Inventors: Kiyoshi Sano, Tokyo (JP); Tetsuo Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 1251 days.

(21) Appl. No.: 12/049,115

(22) Filed: Mar. 14, 2008

(65) Prior Publication Data
US 2008/0228780 A1 Sep. 18, 2008

(30) Foreign Application Priority Data

Mar. 16, 2007 (JP) ................................. 2007-067956

(51) Int. Cl.
*G06F 9/455* (2006.01)
*G06F 9/46* (2006.01)
(52) U.S. Cl.
USPC ........... 718/102; 718/100; 718/103; 718/107; 718/105; 719/316; 702/182
(58) Field of Classification Search
USPC ...... 718/100, 102, 105, 107, 103, 1; 719/316; 702/182; 712/28; 713/1, 2
See application file for complete search history.

(56) References Cited

U.S. PATENT DOCUMENTS

| | | | | |
|---|---|---|---|---|
| 6,058,267 | A * | 5/2000 | Kanai et al. ..................... 712/28 |
| 7,315,795 | B2 * | 1/2008 | Homma ........................ 702/182 |
| 2005/0172303 | A1 * | 8/2005 | Kudo et al. ................... 719/316 |
| 2005/0268303 | A1 * | 12/2005 | Anderson et al. ............. 718/102 |
| 2006/0070073 | A1 * | 3/2006 | Maeda et al. ................. 718/100 |
| 2006/0150191 | A1 * | 7/2006 | Masuda et al. ................ 718/105 |
| 2006/0206900 | A1 * | 9/2006 | Ooyama et al. ............... 718/105 |
| 2006/0218558 | A1 * | 9/2006 | Torii et al. ..................... 718/107 |
| 2006/0230402 | A1 * | 10/2006 | Newport et al. .................. 718/1 |
| 2006/0253853 | A1 * | 11/2006 | Jiang ............................ 718/100 |
| 2009/0031319 | A1 * | 1/2009 | Fecioru ........................ 718/103 |
| 2010/0333102 | A1 * | 12/2010 | Balasubramanian ......... 718/103 |

FOREIGN PATENT DOCUMENTS

JP 06044262 A 2/1994

* cited by examiner

*Primary Examiner* — Thomas Lee
*Assistant Examiner* — Aurel Prifti (57) ABSTRACT

An information processing apparatus comprises a plurality of control units, a shared memory, a processing number table and a start-up time table. When a transaction is received, each of the control units determines whether the current time in the shared memory coincides with the most recent start-up time in the processing number. If the current time does not coincide with the most recent start-up time, each of the control units updates the most recent start-up time with current time and if or not, adds 1 to the number of transactions being processed in the processing number table so as to update the number of transactions being processed. After the number of transactions is updated, each of the control units sums up the number of transactions being processed in the processing number table. Each of the control units determines whether the number of transactions is not more than the threshold value in the shared memory. If the number of transactions is not more than the threshold value, each of the control units starts the distributed transaction to be processed.

13 Claims, 4 Drawing Sheets

SHARED MEMORY (14)

| THRESHOLD VALUE | 13 |
|---|---|
| CURRENT TIME | 01:10:50:70 |

| | MOST RECENT START-UP TIME |
|---|---|
| CONTROL SECTION A | 01:10:50:70 |
| CONTROL SECTION B | 01:09:20:40 |
| CONTROL SECTION C | 01:10:50:70 |

| | IN-PROCESS TRANSACTION NUMBER |
|---|---|
| CONTROL SECTION A | 5 |
| CONTROL SECTION B | 5 |
| CONTROL SECTION C | 2 |

FIG.6

INFORMATION PROCESSING APPARATUS HAVING A PLURALITY OF CONTROL UNITS RECEIVING TRANSACTIONS AT THE CURRENT TIME SUCH THAT WHEN THE CURRENT TIME COINCIDES WITH MOST RECENT START-UP TIME THE CONTROL UNITS UPDATE THE START-UP TIME WITH THE CURRENT TIME AND SUM UP THE NUMBER OF TRANSACTIONS BEING PROCESSED LIMITED TO A PREDETERMINED THRESHOLD

This application is based upon and claims the benefit of priority from Japanese patent application No. 2007-067956, filed on Mar. 16, 2007, the disclosure of which is incorporated herein in its entirety by reference.

BACKGROUND OF THE INVENTION

1. Field of the Invention

The present invention relates to an information processing apparatus, an information processing method, and an information processing program.

2. Description of the Related Art

There has been proposed an information processing apparatus provided with a plurality of processors (central processing units (e.g., JP-A-06-44262). In such an information processing apparatus, a transaction is processed by a plurality of processors.

A shared memory accessible from a plurality of processors is provided in such an information processing apparatus. The number (threshold value) of transactions that can be executed simultaneously by the information processing apparatus or total number of transactions being processed is stored in the shared memory. The total number of transactions to be processed is controlled so as not to exceed the threshold value.

The current total number of transactions stored in the shared memory is updated from respective processors under exclusive control. However, a deadlock or data inconsistency may occur resulting from the exclusive control.

SUMMARY OF THE INVENTION

The present invention has been made in view of the above problem, and an object thereof is to provide an information processing apparatus, an information processing method, and an information processing program capable of satisfactorily processing transactions.

To achieve the above object, according to a first aspect of the present invention, there is provided an a plurality of control units for processing a transaction to be received and distributed on the basis of a predetermined condition; a shared memory, referred to respectively by each of the plurality of control units, for storing a threshold value indicating the upper limit of the number of transactions that can be processed per a predetermined unit time by the entire system and current time data updated every time the predetermined unit time has passed; a processing number table for storing the number of transactions being processed per the predetermined unit time by each of the plurality of control units; and a start-up time table for storing the most recent start-up time of each of the plurality of control units.

The each of the plurality of control units acquires the current time by referring to the current time data stored in the shared memory when a transaction is distributed and then determines whether the current time coincides with the most recent start-up time of corresponding control unit stored in the start-up time table. If the current time does not coincide with the most recent start-up time, the each of the plurality of control units updates the most recent start-up time with acquired current time and then, clears the number of transactions being processed stored in the processing number table to set 1 as the number of transactions being processed. If the current time coincides with the most recent start-up time, the each of the plurality of control units adds 1 to the number of transactions being processed stored in the processing number table so as to update the number of transactions being processed by the corresponding control unit.

After the number of transactions is updated, the each of the plurality of control units sums up the number of transactions being processed by all the control units stored in the processing number table. And then the each of the plurality of control units determines whether the number of transactions is not more than the threshold value stored in the shared memory. If the number of transactions is not more than the threshold value, the each of the plurality of control units starts the distributed transaction to be processed. If the number of transactions is more than the threshold value, the each of the plurality of control units issues an error notification to a transmission source of the transaction.

DESCRIPTION OF THE PREFERRED EXEMPLARY EMBODIMENTS

An information processing apparatus according to an exemplary embodiment of the present invention will be described below.

(First Exemplary Embodiment)

Figure 1:
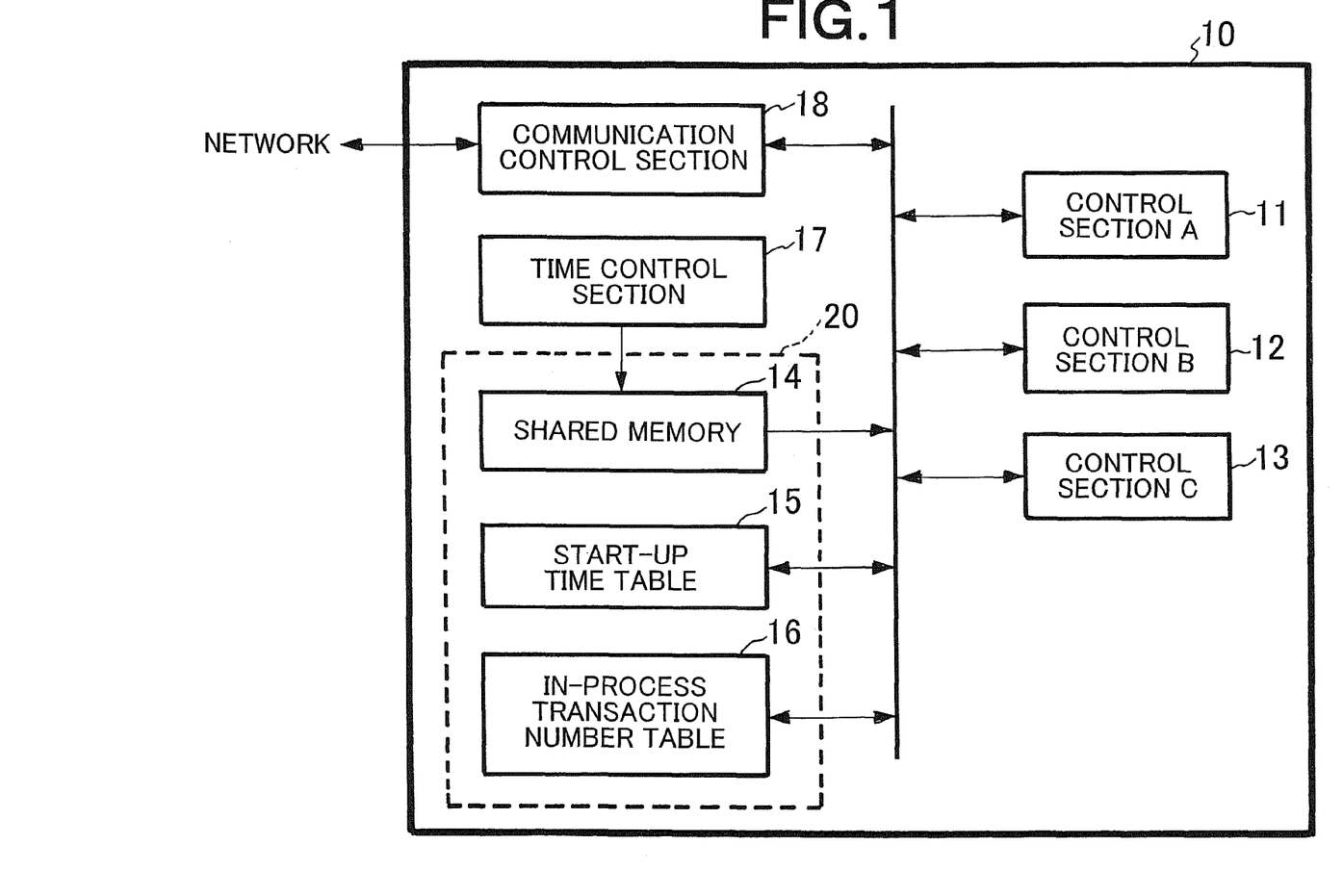
FIG. 1 shows a block diagram of an entire configuration of an information update system according to an exemplary embodiment of the present invention.

FIG. 1 is a block diagram showing an entire configuration of an information processing apparatus 10 according to the first present exemplary embodiment of the present invention. As shown in FIG. 1, the information processing apparatus 10 includes a control section A11, a control section B12, a control section C13, a time control section 17, a communication control section 18, and a storage unit 20. The storage unit 20 includes a shared memory 14, a start-up time table 15, and an in-process transaction number table 16.

Each of the control sections A11, B12, and C13 is constituted by a CPU (Central Processing Unit) for controlling operation, a ROM (Read Only Memory) for storing an operation program of the CPU, a RAM (Random Access Memory) serving as a work area, and the like. The control sections A11 to C13 (i.e., respective CPUs) process a transaction received by the information processing apparatus 10, respectively. In the present exemplary embodiment, the received transaction is distributed between the control sections A11 to C13 depending on the type of the transaction. The control sections A11 to C13 operate independently of one another in the information processing apparatus 10, so that a plurality of transactions can be processed in parallel.

The storage unit 20 is constituted by a hard disk drive, a flash memory, a RAM, or the like.

Figure 2:
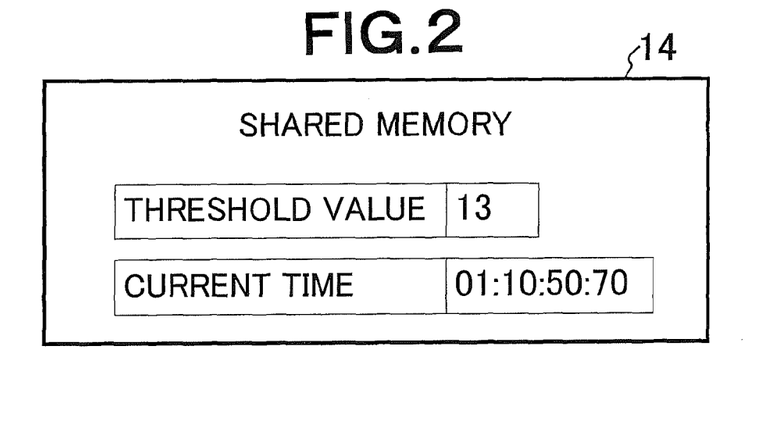
FIG. 2 shows a view of a content stored in a shared memory shown in FIG. 1.

The shared memory 14 is a memory used by the control sections A11 to C13 only as a reference. FIG. 2 is a view showing the content stored in the shared memory 14. As shown in FIG. 2, the shared memory 14 stores a threshold value indicating the upper limit of the number of transactions that the entire information processing apparatus 10 can process per unit time, and a current time. In the case of the present exemplary embodiment, the threshold value is set to 13, i.e., up to 13 transactions can be processed per unit time by the control sections A11 to C13. The current time indicates the current time of a system clock of the information processing apparatus. The current time is updated at a predetermined cycle (e.g., every 1 millisecond) by the time control section 17.

Figure 3:
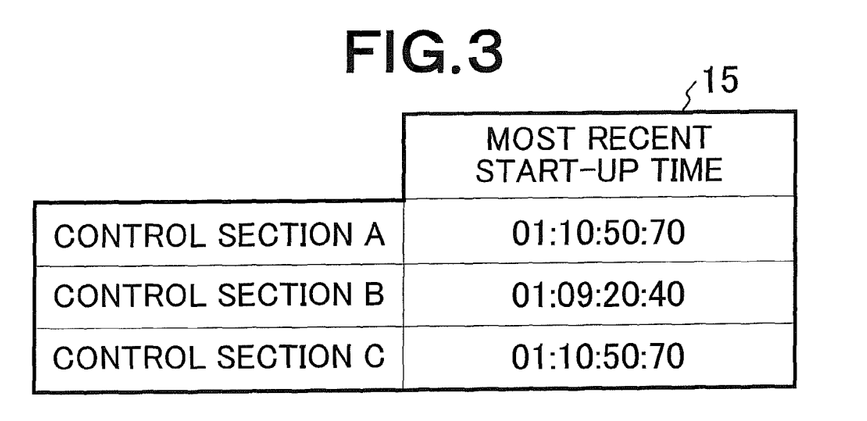
FIG. 3 shows a view of a configuration example of a start-up time table shown in FIG. 1.

As shown in FIG. 3, the start-up time table 15 stores the time (most recent stat-up time) at which the respective control sections A11 to C13 were most recently started up. Specifically, when a transaction is received by the information processing apparatus 10, a control section corresponding to the transaction refers to the current time stored in the shared memory 14 to thereby acquire it and updates the start-up time table 15 with the acquired current time.

Figure 4:
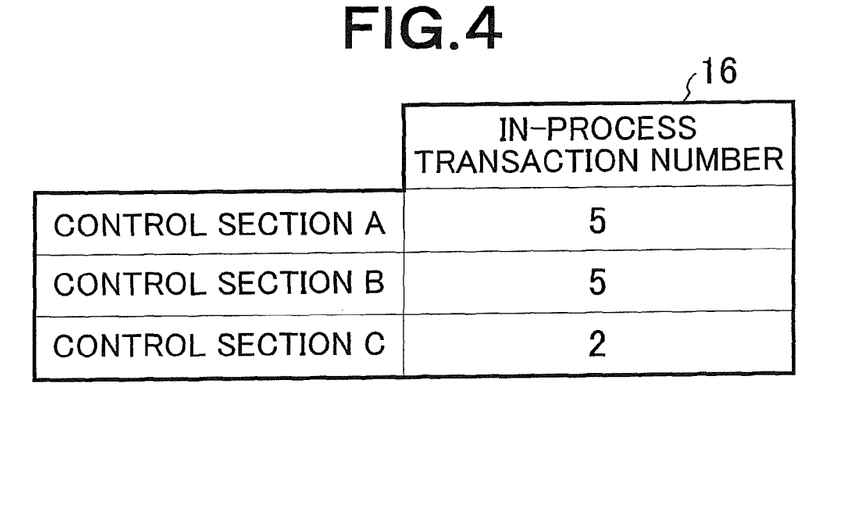
FIG. 4 shows a view of a configuration example of an in-process transaction number table shown in FIG. 1.

As shown in FIG. 4, the in-process transaction number table 16 stores the number of transactions that each of the control sections A11 to C13 processes per unit time. The unit time here is the same as the cycle at which the time control section 17 updates the current time stored in the shared memory 14. Further, the unit time is a time sufficient for each of the control sections A11 to C13 to process a transaction. That is, each of the control sections A11 to C13 completes the transaction processing at the timing at which the time control section 17 updates the current time stored in the shared memory 14.

That is, when a transaction is received by the information processing apparatus 10, the control section A11, B12, or C13 updates the start-up time table 15 with the current time. At this time, when the most recent start-up time stored in the start-up time table 15 coincides with the current time, it is determined that a new transaction has been received within the unit time. Then, 1 is added to the number of transactions stored in the in-process transaction number table 16.

Thus, when the numbers of each transaction stored in the in-process transaction number table 16 are summed up, the number of transactions that is being processed per unit time in the entire information processing apparatus 10 can be obtained. The obtained number is compared with the threshold value stored in the shared memory 14. When the obtained number is not more than the threshold value, the newly received transaction is processed, while when the obtained number is more than the threshold value, it is determined that the load applied to the information processing apparatus 10 is too large. Then, the newly received transaction is not processed but an error notification is issued.

The communication control section 18 receives a transaction and transmits a transaction processed by each of the control sections A11 to C13 through a network. Any network, such as the Internet, Intranet, LAN (Local Area Network), and WAN (Wide Area Network) can be used as long as it can transmit/receive a transaction.

Figure 5:
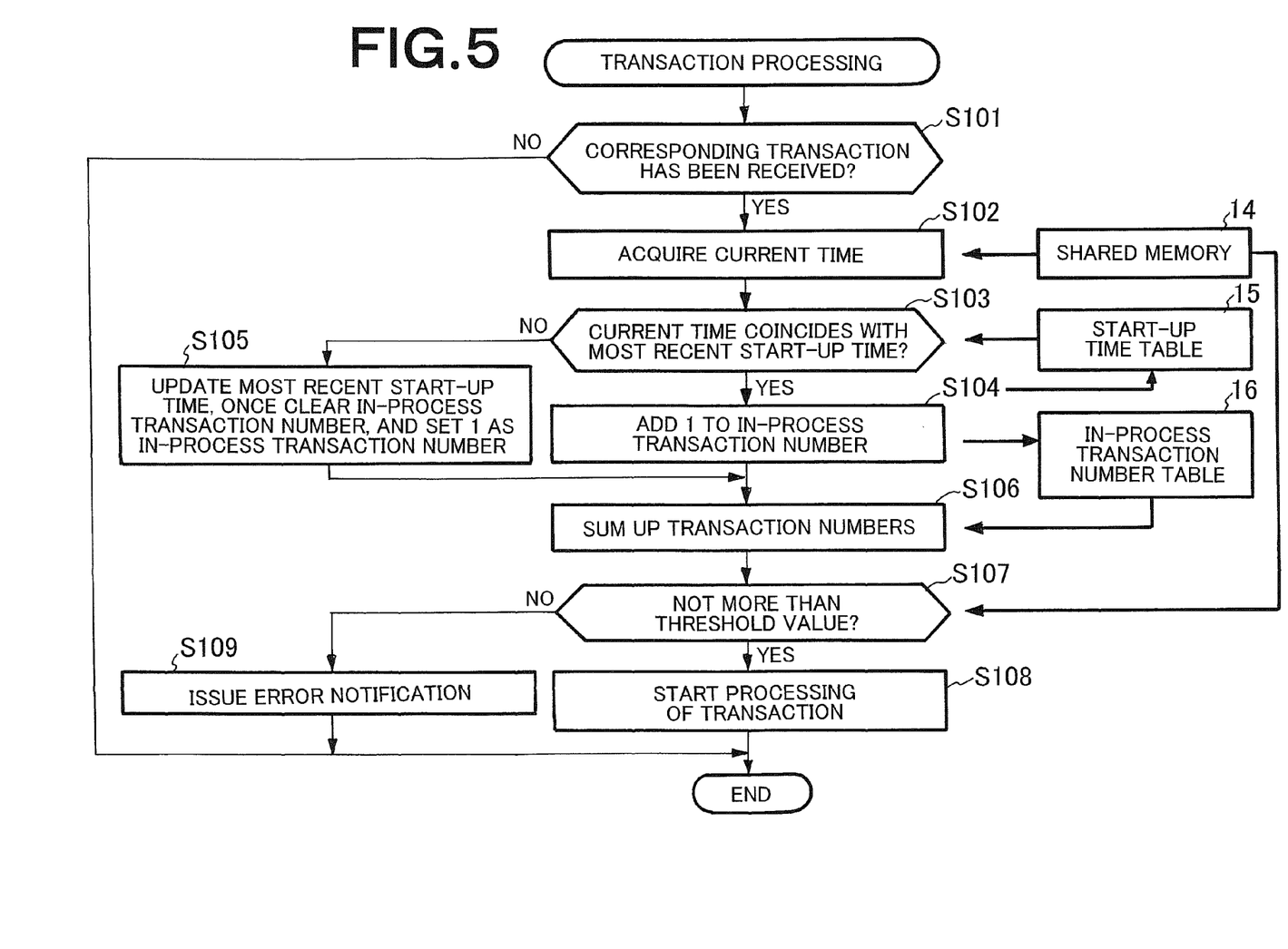
FIG. 5 shows a flowchart for explaining operation of transaction processing.

Next, operation in which the information processing apparatus 10 processes transactions will be described. FIG. 5 is a flowchart for explaining operation of transaction processing executed by the control sections A11 to C13. Operation programs executing the operation flow are stored in the ROM of each of the control sections A11 to C13 and periodically executed.

First, in this transaction processing, a CPU of one control section determines whether a transaction has been received or not (step S101). The transaction may be distributed between the control sections A11 to C13 depending on the type or transmission source of the transaction received by the communication control section 18.

When determining in step S101 that a corresponding transaction has not been received (No in step S101), this flow is ended.

When determining in step S101 that a corresponding transaction has been received (Yes in step S101), the CPU refers to the shared memory 14 to acquire the current time (step S102).

After acquiring the current time in step S102, the CPU refers to the start-up time table 15 and determines whether the acquired current time coincides with the most recent start-up time of a corresponding control section (step S103).

When determining in step S103 that the current time acquired in step S102 and most recent start-up time coincide with each other (Yes in step S103), the CPU refers to the in-process transaction number table 16 and adds 1 to the number of transactions of a corresponding control section (step S104). That is, in this case, it is determined that a new transaction has been received within a single cycle (unit time) and, therefore, 1 is added to the number of transactions processed per unit time.

When determining in step S103 that the current time acquired in step S102 and most recent start-up time do not coincide with each other (No in step S103), the CPU updates the most recent start-up time stored in the start-up time table 15 with the current time, once clears the number of transactions stored in the in-process transaction number table 16, and sets 1 (i.e., transaction received this time) as the number of transactions (step S105). That is, in this case, it is determined that a new transaction has been received after a one cycle or more has elapsed from the most recent start-up time and, therefore, the number of transactions is once cleared and 1 is set as the transaction number.

After updating the transaction number of the in-process transaction number table 16 in step S104 or step S105, the CPU sums up the transaction numbers of all the control sections (control sections A11, B12, and C13) stored in the in-process transaction number table 16 (step S106). In the example shown in FIG. 4, "12" is obtained as the summation.

After summing up the transaction numbers in step S106, the CPU refers to the shared memory 14 and determines whether the summation of the transaction numbers is not more than the threshold value (step S107). That is, it is determined whether the load applied to the information processing apparatus 10 is within the upper limit value.

When determining that the summation of the transaction numbers is not more than the threshold value (Yes in step S107), the CPU starts processing of the transaction received in step S101 (step S108). Since the threshold value is "13" (FIG. 2) and summation is "12" (FIG. 4), it is determined that the summation of the transaction numbers is not more than the threshold value.

When determining that the summation of the transaction numbers is more than the threshold value (No in step S107), the CPU does not process the transaction received in step S101 but issues an error notification to a transmission source of the transaction through the communication control section 18 (step S109). That is, the transmission source that receives the error notification needs to transmit the transaction once again.

As described above, when receiving the transaction (Yes in step S101), the CPU refers to the shared memory 14 to acquire the current time (step S102) and then refers to the start-up time table 15 to determine whether the current time coincides with the most recent start-up time of the corresponding control section (step S103). After updating the in-process transaction number table 16 in accordance with the determination result, the CPU sums up the number of transactions (step S106) and refers to the shared memory 14 to determine whether the summation of the transaction number is not more than a threshold value (step S107). When determining that the summation of the transaction number is not more than a threshold value (Yes in step S107), the CPU starts processing of the transaction received (step 108).

Accordingly, in the information processing apparatus 10 according to the present invention, a threshold value indicating the upper limit of the number of transactions that can be processed per unit time by the entire information processing apparatus 10 is stored in the shared memory 14 that is used only as a reference. This configuration prevents a conflict between processing even in this information processing apparatus 10 provided with a plurality of control sections (CPUs) for processing transactions, thereby eliminating the need to perform exclusive control. As a result, it is possible to avoid a deadlock resulting from the exclusive control, thereby increasing system reliability.

The present invention is not limited to the above exemplary embodiment, and various modifications and applications can be made. Further, it is possible to freely combine the above exemplary embodiment and a modification.

Figure 6:
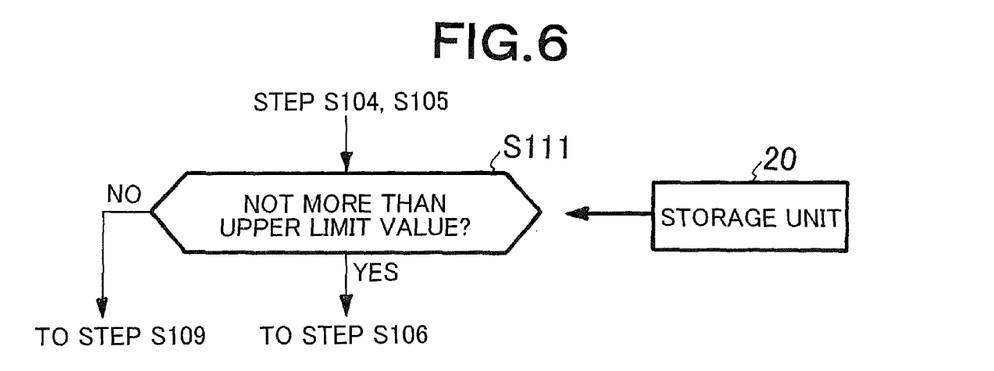
FIG. 6 shows a flowchart for explaining a modification of the operation of transaction processing.

In the above exemplary embodiment, the information processing apparatus 10 stores a threshold value indicating the upper limit of the number of transactions that can be processed by the entire information processing apparatus 10 and determines whether a value obtained by summing up the transaction numbers of the respective control sections A11 to C13 is not more than the threshold value so as to determine whether an excessive load is applied to the information processing apparatus 10. Alternatively, however, the information processing apparatus 10 may store upper limit values each indicating the upper limit of the number of transactions that can be executed by each of the control sections A11 to C13. In this case, the configuration may be arranged as follows. The upper limit values are stored in a predetermined area on the storage unit 20, and then it is determined whether the number of transactions of a corresponding control section is not more than the upper limit value as shown in FIG. 6 before the summation of the transaction numbers of all the control sections in step S106 (step S111). When it is determined that the transaction number is not more than the upper limit value (Yes in step S111), the flow advances to step S106, while when it is determined that the transaction number is more than the upper limit value (No in step S111), the flow advances to step S109.

Further, in the above exemplary embodiment, the transaction numbers of all the control sections stored in the in-process transaction number table 16 are summed up in step 106 shown in FIG. 5. Alternatively, however, the CPU may sum up only the in-process transaction numbers of the control sections whose most recent start-up times coincide with each other by referring to the in-process transaction number table 16 in step S106. Referring to FIGS. 3 and 4, in the case where the control section A11 executes the transaction processing, only the in-process transaction numbers of the control sections A11 and C13 whose most recent start-up times coincide with each other are summed up. That is, the summation obtained in step S106 is "12" in the above exemplary embodiment, while "7" is obtained in this configuration. This configuration eliminates the addition of the number of transactions that have already been completed, whereby whether an excessive load is applied to the information processing apparatus 10 can be determined more accurately.

Alternatively, each of the control sections A11 to C13 may perform subtraction for the transaction number stored in the in-process transaction number table 16 every time it completes the transaction processing. That is, for example, every time the processing of a transaction started in step S108, the transaction number stored in the in-process transaction number table 16 is updated. This configuration also eliminates the addition of the number of transactions that have already been completed, whereby whether an excessive load is applied to the information processing apparatus 10 can be determined more accurately.

Although concrete examples of the transaction have not been described in the above exemplary embodiment, any type of transaction may be applied to the present invention.

Further, although three control sections (control sections A11, B12, and C13) are provided in the information processing apparatus 10, the number of control sections may be arbitrary as long as it is two or more.

Further, in the above exemplary embodiment, the program for the transaction processing that each of the control sections A11 to C13 executes is previously stored in the ROM provided in each thereof. Alternatively, however, the program may be stored in a shared ROM. In this case, the CPU of each of the control sections A11 to C13 reads out the program from the shared ROM so as to execute it. Further, the program may be stored in a computer-readable storage medium such as a memory card, a CD-ROM (Compact Disc Read-Only Memory), a DVD (Digital Versatile Disk), and an MO (Magneto Optical disk), distributed, and installed in a predetermined area on the information processing apparatus 10 so as to be executed as described above.

Further, the program may be stored in a disk drive or the like that a server on the Internet has. In this case, for example, the program is superimposed on a carrier wave and downloaded to the information processing apparatus 10.

(Second Exemplary Embodiment)

According to the second exemplary embodiment of the invention, there is provided an information processing apparatus, including: a reception unit for receiving a transaction; a distribution unit for distributing the transaction received by the reception unit based on a predetermined condition; a plurality of control units for processing the transaction distributed by the distribution unit; a shared memory referred to respectively by each of the plurality of control units; a processing number table for storing the number of transactions being processed per a predetermined unit time by each of the plurality of control units; and a start-up time table for storing the most recent start-up time of each of the plurality of control units. The shared memory stores a threshold value indicating the upper limit of the number of transactions that can be processed per the unit time by the entire system and current time data updated every time the unit time has passed. Each of the plurality of the control units includes: a time-coincidence determination unit for acquiring the current time by referring to the current time data stored in the shared memory when a transaction is distributed by the distribution unit and determining whether the current time coincides with the most recent start-up time of a corresponding control unit; a processing number update unit for updating the most recent start-up time with the current time acquired by the time-coincidence determination unit in the case where the time-coincidence determination unit determines that the current time does not coincide with the most recent start-up time, clearing the number of transactions being processed stored in the processing number table to set 1 as the number of transactions being processed, and adding 1 to the number of transactions being processed stored in the processing number table so as to update the number of transactions being processed by the corresponding control unit in the case where the time-coincidence determination unit determines that the current time coincides with the most recent start-up time; a summation unit for summing up the number of transactions being processed by all the control units stored in the processing number table after the processing number update unit updates the number of transactions; and a threshold value determination unit for determining whether the number of transactions obtained by the summation unit is not more than the threshold value stored in the shared memory. In the case where the threshold value determination unit determines that the number of transactions obtained by the summation unit is not more than the threshold value, the distributed transaction is started to be processed, while in the case where the threshold value determination unit determines that the number of transactions obtained by the summation unit is more than the threshold value, an error notification is issued to a transmission source of the transaction.

In the information processing apparatus according to the second exemplary embodiment, each of the plurality of the control units may further comprise: upper limit value table for storing the upper limit value indicating the upper limit of the number of transactions that can be processed by corresponding control unit; and upper limit value determination unit for determining whether the number of transactions is not more than the upper limit value after the processing number update unit updates the number of transactions. In the case where the upper limit value determination unit determines that the number of transactions is not more than the upper limit value, the threshold value determination unit executes the determination, while in the case where the upper limit value determination unit determines that the number of transactions is more than the upper limit value, an error notification is issued to a transaction transmission source.

In the information processing apparatus according to the second exemplary embodiment, the summation unit may only sum up the number of transactions being processed by the control units whose most recent start-up times stored in the start-up time table coincide with each other.

In the information processing apparatus according to the second exemplary embodiment, the predetermined unit time may be a time sufficient for each of the plurality of the control units to process a transaction.

In the information processing apparatus according to the second exemplary embodiment, each of the plurality of the control units further comprising subtraction unit for subtracting 1 from the number of transactions being processed by a corresponding control unit which is stored in the processing number table every time the processing of a transaction is completed.

(Third Exemplary Embodiment)

According to the third exemplary embodiment of the invention, there is provided an information processing method, comprising: a reception step of receiving a transaction, and a transaction processing step of processing the transaction received in the reception step using any of a plurality of control units.

The transaction processing step further comprises: a current time acquisition step of acquiring the current time when a transaction is received by the reception step; a time-coincidence determination step of determining whether the current time acquired in the current time acquisition step coincides with the time at which a transaction has been received in the previous reception step; a processing number update step of updating the number of transactions being processed which is stored in association with each of the control units to 1 in the case where a negative determination is made in the time-coincidence determination step while adding 1 to the number of transactions being processed so as to update the number of transactions in the case where a positive determination is made in the time-coincidence determination step; a summation step of summing up the number of transactions being processed by all the control units after the number of transactions is updated in the processing number update step; a threshold value determination step of determining whether the number of transactions obtained in the summation step is not more than a predetermined threshold value; a processing step of processing the transaction received in the reception step in the case where the number of transactions is determined to be not more than the threshold value in the threshold value determination step; and an error issuance step of issuing an error notification to a transaction transmission source in the case where the number of transactions is determined to be more than the threshold value in the threshold value determination step.

The information processing method according to the third exemplary embodiment may further comprise: an upper limit value determination step of determining whether the number of transactions is not more than a predetermined upper limit value after the number of transactions is updated in the processing number update step; a step of executing the threshold value determination step in the case where it is determined in the upper limit value determination step that the number of transactions is not more than the upper limit value; and a step of issuing an error notification to a transaction transmission source in the case where it is determined in the upper limit value determination step that the number of transactions is more than the upper limit value.

The information processing method according to the third exemplary embodiment may further comprise a time storage step of storing the time at which a transaction has been received in the reception step in association with a control unit that processes the transaction, wherein the number of transactions of only a control unit in which the time stored in the time storage step is the newest is subjected to summation in the summation step.

The information processing method according to the third exemplary embodiment may further comprise a subtraction step of subtracting 1 from the number of transactions being processed every time the processing of a transaction is completed in the processing step.

(Fourth Exemplary Embodiment)

According to the fourth exemplary embodiment of the invention, there is provided an information processing program, encoded in a computer-readable medium, for enabling a computer including a plurality of control units to execute: a reception step of receiving a transaction, and a transaction processing step of processing the transaction received in the reception step using any of the plurality of control units.

The transaction processing step further comprises: a current time acquisition step of acquiring the current time when a transaction is received by the reception step; a time-coincidence determination step of determining whether the current time acquired in the current time acquisition step coincides with the time at which a transaction has been received in the previous reception step; a processing number update step of updating the number of transactions being processed which is stored in association with each of the control units to 1 in the case where a negative determination is made in the time-coincidence determination step while adding 1 to the number of transactions being processed so as to update the number of transactions in the case where a positive determination is made in the time-coincidence determination step; a summation step of summing up the number of transactions being processed by all the control units after the number of transactions is updated in the processing number update step; a threshold value determination step of determining whether the number of transactions obtained in the summation step is not more than a predetermined threshold value; a processing step of processing the transaction received in the reception step in the case where the number of transactions is determined to be not more than the threshold value in the threshold value determination step; and an error issuance step of issuing an error notification to a transaction transmission source in the case where the number of transactions is determined to be more than the threshold value in the threshold value determination step.

The information processing program according to the fourth exemplary embodiment may further enable the computer to execute: an upper limit value determination step of determining whether the number of transactions is not more than a predetermined upper limit value after the number of transactions is updated in the processing number update step; a step of executing the threshold value determination step in the case where it is determined in the upper limit value determination step that the number of transactions is not more than the upper limit value; and a step of issuing an error notification to a transaction transmission source in the case where it is determined in the upper limit value determination step that the number of transactions is more than the upper limit value.

The information processing program according to the forth exemplary embodiment may further enable the computer to execute: a time storage step of storing the time at which a transaction has been received in the reception step in association with a control unit that processes the transaction, wherein the number of transactions of only a control unit in which the time stored in the time storage step is the newest is subjected to summation in the summation step.

The information processing program according to the fourth exemplary embodiment may further enable the computer to execute: a subtraction step of subtracting 1 from the number of transactions being processed every time the processing of a transaction is completed in the processing step.

According to the exemplary embodiments of the present invention, it is possible to provide an information processing apparatus, an information processing method, and an information processing program capable of satisfactorily processing transactions.

While the invention has been particularly shown and described with reference to the exemplary embodiments thereof, the invention is not limited to these exemplary embodiments. It will be understood by those of ordinary skill in the art that various changes in form and details may be made therein without departing from the spirit and scope of the present invention as defined by the claims.

This application is based upon and claims the benefit of priority from Japanese patent application No. 2007-067956 filed on Mar. 16, 2007, the disclosure of which is incorporated herein in its entirety by reference.

What is claimed is:

1. An information processing apparatus comprising:
   a plurality of control units for processing transactions that are received by the apparatus and distributed among the plurality of control units on the basis of a predetermined condition;
   a shared memory that is referred to from each of the plurality of control units, the shared memory storing a threshold value and a current time, the threshold value indicating an upper limit for total number of transactions that can be processed per a predetermined unit time by the apparatus and the current time being updated every time the predetermined unit time has passed;
   a processing number table for storing a current number of transactions being currently processed per the predetermined unit time by each of the plurality of control units; and
   a start-up time table for storing a most recent start-up time of each of the plurality of control units, wherein
   the each of the plurality of control units:
   acquires the current time by referring to the shared memory when a transaction is distributed and then determines whether the current time coincides with the most recent start-up time of corresponding control unit stored in the start-up time table;
   if the current time does not coincide with the most recent start-up time, updates the most recent start-up time with the acquired current time and then, clears and sets to one the current number of transactions being currently processed stored in the processing number table;
   if the current time coincides with the most recent start-up time, updates the current number of transactions being currently processed stored in the processing number table by adding one to the current number;
   after the current number of transactions is updated, sums up the current number of transactions being currently processed by all the control units stored in the processing number table;
   determines whether the summed up current number of transactions is not more than the threshold value stored in the shared memory;
   if the summed up current number of transactions is not more than the threshold value, starts the distributed transaction to be processed; and
   if the summed up current number of transactions is more than the threshold value, issues an error notification to a transmission source of the transaction,
   wherein the each of the plurality of control units comprises an upper limit value table for storing an individual upper limit value indicating an individual upper limit for number of transactions that can be individually processed by the corresponding control unit,
   wherein the each of the plurality of control units:
   after the current number of transactions is updated, determines whether the current number of transactions is not more than the individual upper limit value;
   if the current number of transactions is not more than the individual upper limit value, determines whether the summed up current number of transactions is not more than the threshold value stored in the shared memory; and
   if the current number of transactions is more than the individual upper limit value, issues the error notification to the transmission source.

2. The information processing apparatus according to claim 1, wherein the each of the plurality of control units sums up the current number of transactions being currently processed by the control units whose most recent start-up times stored in the start-up time table coincide with each other.

3. The information processing apparatus according to claim 1, wherein the predetermined unit time is a time sufficient for each of the plurality of control units to process a transaction.

4. The information processing apparatus according to claim 1, wherein the each of the plurality of the control units subtracts one from its own current number stored in the processing number table every time a processing of the transaction is completed.

5. An information processing method comprising:
a reception step of receiving a transaction, and
a transaction processing step of processing the transaction received in the reception step using any of a plurality of control units,
the transaction processing step further comprising:
a current time acquisition step of acquiring the current time when a transaction is received by the reception step;
a time-coincidence determination step of determining whether the current time acquired in the current time acquisition step coincides with a time at which a transaction has been received in the reception step previously done;
a processing number update step of updating a current number of transactions being currently processed which is stored in association with each of the control units by setting the current number to one in a case where a negative determination is made in the time-coincidence determination step, while updating the current number by adding one to the current number in a case where a positive determination is made in the time-coincidence determination step;
a summation step of summing up the current number of transactions being currently processed by all the control units after the current number of transactions is updated in the processing number update step;
a threshold value determination step of determining whether the summed up current number of transactions obtained in the summation step is not more than a predetermined threshold value;
a processing step of processing the transaction received in the reception step in a case where the summed up current number of transactions is determined to be not more than the threshold value in the threshold value determination step; and
an error issuance step of issuing an error notification to a transaction transmission source in a case where the summed up current number of transactions is determined to be more than the threshold value in the threshold value determination step,
wherein the method further comprises:
an upper limit value determination step of determining whether the current number of transactions is not more than a predetermined upper limit value after the current number of transactions is updated in the processing number update step;
a step of executing the threshold value determination step in a case where it is determined in the upper limit value determination step that the updated current number of transactions is not more than the upper limit value; and
a step of issuing an error notification to a transaction transmission source in a case where it is determined in the upper limit value determination step that the updated current number of transactions is more than the upper limit value.

6. The information processing method according to claim 5, further comprising a time storage step of storing a time at which a transaction has been received in the reception step in association with a control unit that processes the transaction, wherein
the current number of transactions of only a control unit in which the time stored in the time storage step is newest is subjected to summation in the summation step.

7. The information processing method according to claim 5, further comprising a subtraction step of subtracting one from the current number of transactions being currently processed every time the processing of a transaction is completed in the processing step.

8. The information processing apparatus according to claim 5, wherein the predetermined unit time is a time sufficient for each of the plurality of control units to process a transaction.

9. A non-transitory computer-readable medium embodying an information processing program for enabling a computer including a plurality of control units to execute:
a reception step of receiving a transaction, and
a transaction processing step of processing the transaction received in the reception step using any of the plurality of control units,
the transaction processing step further comprising:
a current time acquisition step of acquiring the current time when a transaction is received by the reception step;
a time-coincidence determination step of determining whether the current time acquired in the current time acquisition step coincides with a time at which a transaction has been received in the reception step previously done;
a processing number u date step of updating a current number of transactions being currently processed which is stored in association with each of the control units by setting the current number to one in a case where a negative determination is made in the time-coincidence determination step, while updating the current number by adding one to the current number in a case where a positive determination is made in the time-coincidence determination step;
a summation step of summing the current number of transactions being currently processed by all the control units after the current number of transactions is updated in the processing number update step;
a threshold value determination step of determining whether the summed up current number of transactions obtained in the summation step is not more than a predetermined threshold value;
a processing step of processing the transaction received in the reception step in a case where the summed up current number of transactions is determined to be not more than the threshold value in the threshold value determination step; and
an error issuance step of issuing an error notification to a transaction transmission source in a case where the summed up current number of transactions is determined to be more than the threshold value in the threshold value determination step,
wherein said program further enables the computer to execute:
an upper limit value determination step of determining whether the current number of transactions is not more than a predetermined individual upper limit value after the current number of transactions is updated in the processing number update step;
a step of executing the threshold value determination step in a case where it is determined in the upper limit value determination step that the current number of transactions is not more than the individual upper limit value; and a step of issuing an error notification to a transaction transmission source in a case where it is determined in the upper limit value determination step that the current number of transactions is more than the individual upper limit value.

10. The non-transitory computer-readable medium according to claim 9, wherein said program further enables the computer to execute:

a time storage step of storing a time at which a transaction has been received in the reception step in association with a control unit that processes the transaction, wherein the current number of transactions of only a control unit in which the time stored in the time storage step is newest is subjected to summation in the summation step.

11. The non-transitory computer-readable medium according to claim 9, wherein said program further enables the computer to execute:

a subtraction step of subtracting one from the current number of transactions being currently processed every time the processing of a transaction is completed in the processing step.

12. The non-transitory computer-readable medium according to claim 9, wherein the predetermined unit time is a time sufficient for each of the plurality of control units to process a transaction.

13. An information processing apparatus, comprising:

a plurality of control units for processing a transaction;

a shared memory of the plurality of control units, for storing a threshold value of an upper limit for total number of transactions per a predetermined unit time of the apparatus and current time updated every the predetermined unit time;

a processing number table for storing a current number of transactions corresponding to each of the plurality of control units; and a start-up time table for storing a most recent start-up time of each of the plurality of control units, wherein each of the plurality of control units:

when a transaction is received, determines whether current time stored in the shared memory coincides with the most recent start-up time stored in the start-up time table and then updates the processing number table in accordance with its determination result;

after the processing number table is updated, sums up the current number of transactions and then, determines whether its summation of the current number is not more than the threshold value stored in the shared memory;

if the summation is not more than the threshold value, starts processing of the transaction received; and if the number of transactions is more than the threshold value, issues an error notification to a transmission source of the transaction, wherein the each of the plurality of control units comprises an upper limit value table for storing an individual upper limit value indicating an individual upper limit for number of transactions that can be individually processed by the corresponding control unit, wherein the each of the plurality of control units:

after the current number of transactions is updated, determines whether the current number of transactions is not more than the individual upper limit value;

if the current number of transactions is not more than the individual upper limit value, determines whether the summed up current number of transactions is not more than the threshold value stored in the shared memory; and if the current number of transactions is more than the individual upper limit value, issues the error notification to the transmission source.

* * * * *